(12) United States Patent
Moon et al.

(10) Patent No.: US 7,405,265 B2
(45) Date of Patent: Jul. 29, 2008

(54) METHOD OF PREPARING CATALYST FOR POLYMERIZATION OF ALIPHATIC POLYCARBONATE AND METHOD OF POLYMERIZING ALIPHATIC POLYCARBONATE

(75) Inventors: Seung-Jae Moon, Pohang (KR); Moon-Hor Ree, Pohang (KR); Jong-Sung Kim, Pohang (KR); Kie-Soo Kim, Pohang (KR)

(73) Assignees: Posco, Pohang (KR); Postech Foundation, Pohang (KR)

( * ) Notice: Subject to any disclaimer, the term of this patent is extended or adjusted under 35 U.S.C. 154(b) by 40 days.

(21) Appl. No.: 10/519,176

(22) PCT Filed: Jun. 19, 2003

(86) PCT No.: PCT/KR03/01211

§ 371 (c)(1),
(2), (4) Date: Dec. 20, 2004

(87) PCT Pub. No.: WO04/000911

PCT Pub. Date: Dec. 31, 2003

(65) Prior Publication Data

US 2006/0074218 A1    Apr. 6, 2006

(30) Foreign Application Priority Data

Jun. 20, 2002    (KR) .................. 10-2002-0034520

(51) Int. Cl.
*A23J 1/00*    (2006.01)
(52) U.S. Cl. .................. 528/414; 502/150; 525/72; 525/80; 525/181; 525/185; 525/335; 525/336; 525/340; 525/346; 528/196; 528/198; 528/405

(58) Field of Classification Search .................. 528/196, 528/198, 405, 414; 502/150; 525/72, 80, 525/181, 185, 335, 336, 340, 346
See application file for complete search history.

(56) References Cited

U.S. PATENT DOCUMENTS

| 4,943,677 | A | * | 7/1990 | Rokicki ...................... 528/405 |
| 4,960,862 | A |   | 10/1990 | Carroll et al. |
| 5,605,981 | A | * | 2/1997 | Imamura et al. ............ 525/440 |

FOREIGN PATENT DOCUMENTS

| JP | 2003425 | 1/1990 |
| WO | WO 99/11694 A1 | 3/1999 |

OTHER PUBLICATIONS

Li-Chen, et al. Copolymerization of carbon dioxide and propylene oxide and zince catlaysts supprted on carbonayl containing-polymer, Guangzhou Instit. of Chem. Acad. Sinica Guangzhou, China J,. Macromol. Sci. chem. A24 (3&4), pp. 253-260 (1987).*
Rhee et al., "A New Copolymerization Process Leading to Poly (Propylene Carbonate) With a Highly Enhanced Yield From Carbon Dioxide and Propylene Oxide," J. of Polymer Science: Part A: Polymer Chemistry, 37:1883-1876 (1999).
Chen et al., "Copolymerization of Carbon Dioxide and Propylene Oxide With Zinc Catalysts Supported on Carboxyl-Containing Polymers," J. Macromol. Sci.-Chem., A24 (3&4):253-260 (1987).

* cited by examiner

*Primary Examiner*—Terressa Boykin
(74) *Attorney, Agent, or Firm*—JHK Law; Joseph Hyosuk Kim

(57) ABSTRACT

Disclosed is a method of preparing a catalyst for polymerization of aliphatic polycarbonates and a method of polymerizing an aliphatic polycarbonate. This method includes reacting a zinc precursor and organic dicarboxylic acid in a non-ionic surfactant-included solution.

10 Claims, No Drawings

METHOD OF PREPARING CATALYST FOR POLYMERIZATION OF ALIPHATIC POLYCARBONATE AND METHOD OF POLYMERIZING ALIPHATIC POLYCARBONATE

BACKGROUND OF THE INVENTION

1. Field of the Invention

The present invention relates to a method of preparing a catalyst for polymerization of aliphatic polycarbonates and a method of polymerizing an aliphatic polycarbonate, and more particularly, to a method of preparing a catalyst for polymerization of aliphatic polycarbonates exhibiting high catalyst activity using an amphiphilic block copolymer.

2. Background of the Invention

Carbon dioxide from industrial activities, among atmospheric pollutants, has been known as one reason for climatic change according to the UNFCCC, so various studies to reduce the amount of carbon dioxide produced have been undertaken all around the world. Therefore, in order to protect the environment and to use carbon dioxide, a method in which an epoxide reacts with carbon dioxide as a carbon source in the presence of a zinc-included catalyst to prepare an aliphatic polycarbonate has attracted attention.

The aliphatic polycarbonate is able to form a film or a particle, and has uses in many areas such as for ceramic binders, evaporative pattern casting, and adhesives. However, this method has a low yield because of low carbon dioxide reactivity. Accordingly, it is difficult to use industrially, so it is required to prepare a catalyst exhibiting high efficiency for increasing the yield of the aliphatic polycarbonate.

Inoue teaches a method of polycarbonate production from carbon dioxide and epoxide in U.S. Pat. No. 3,585,168.

The Inoue catalyst system was prepared by the reaction of a diethylzinc catalyst with materials containing active hydrogen compounds, e.g., water, dicarboxylic acid, or dihydric phenols, and the typical catalyst productivities ranged from 2.0 to 10.0 grams of polymer per gram of catalyst used. The catalyst has shortcomings associated with use and storage, because of stability and sensitivity to moisture and to other catalyst poisons, and it has a low yield, so it has been required to study other catalyst systems.

Zinc dicarboxylic acid esters (Polymer J. 13(4), 407(1981)) reported by Soga have also been described as effective catalysts for copolymerization of carbon dioxide and propylene oxide, and since these are stable materials with none of the handling problems associated with diethylzinc, they represent interesting candidates for a practical commercial catalyst system.

Motika (U.S. Pat. No. 5,026,676) teaches a method for preparing zinc dicarboxylic acid ester in which zinc oxide reacts with dicarboxylic acid in the presence of an organic solvent. Glutaric acid and adipic acid produced catalysts with higher activity than the known zinc dicarboxylic acid ester catalysts, and the catalyst production is about 2 to 26 grams of the aliphatic polycarbonate per gram of catalyst.

Zinc dicarboxylic acid ester is a heterogeneous catalyst of which catalyst activity depends on its surface structure, so various processes to form a surface structure that gives high catalyst activity have been proposed. For example, Kawachi (U.S. Pat. No. 4,981,948) teaches a method of producing zinc dicarboxylic acid ester with a mechanical pulverization treatment such as with a ball mill, and the yield of the aliphatic polycarbonate is 8.1 to 34.2 gram per gram of the catalyst.

In addition, a method of preparing zinc dicarboxylic acid ester as a homogeneous catalyst is disclosed in U.S. Pat. No. 4,783,445, by Sun. This method includes a reaction of zinc salts with a dicarboxylic acid monoester in an organic solvent, and the yield is 5.1 to 12.4 gram per gram of the catalyst.

SUMMARY OF THE INVENTION

It is an object of the present invention to provide a method of preparing a catalyst for polymerization of an aliphatic polycarbonate, the catalyst including zinc, and producing the aliphatic polycarbonate with a high yield.

It is another object of the present invention to provide a method of polymerizing an aliphatic polycarbonate using the catalyst.

These and other objects may be achieved by a method of preparing a catalyst for polymerization of an aliphatic polycarbonate, including reacting a zinc precursor and an organic dicarboxylic acid in a solution including a templating agent.

In order to achieve these objects and others, the present invention provides a method of polymerizing an aliphatic polycarbonate, including copolymerizing an alkylene oxide and carbon dioxide in the presence of the catalyst.

DETAILED DESCRIPTION OF THE INVENTION

The present invention relates to a method of preparing a catalyst with high activity, used for preparation of an aliphatic polycarbonate by copolymerizing alkylene oxide and carbon dioxide. The inventive procedure is characterized by using a templating agent which renders control over catalyst activity, and it prepares a catalyst with an economical procedure.

The method of preparing the catalyst of the present invention includes reacting a zinc precursor with an organic dicarboxylic acid in a templating agent-included solution to prepare a catalyst for polymerizing an aliphatic polycarbonate, zinc dicarboxylic acid ester. One example of the procedure is shown in the following reaction formula 1. As shown in the reaction formula 1, at least one copolymer with two or more monomers is added to a solvent.

(Reaction Formula 1)

where R is $(CH_2)_x$ and where x is an integer of 0 to 10, e.g., phenyl or naphthaloyl.

The catalyst preparation of the present invention will be illustrated in more detail.

0.01 to 99 parts by weight and preferably 1 to 20 parts by weight of a templating agent are added to 100 parts by weight of a solvent and mixed. In the mixing step, the solvent is preferably maintained at 30 to 80° C. by heating.

The templating agent may be non-ionic surfactant, and preferably an amphiphilic block copolymer. The amphiphilic block copolymer has a lipophilic block and a hydrophilic block, its coagulation energy depends on a repeating unit and molecular weight, and its various phases depend on concentration in a solvent. The amphiphilic block copolymer acts to modify and control morphology of inorganic materials according to an interaction between the block and a solute. Such a modification of morphology allows the surface structure on which catalyst activity depends to be of a molecular scale, and it improves catalyst activity in comparison to the conventional catalyst prepared without the templating agent.

The amphiphilic block copolymer may be an A-B type diblock copolymer or an A-B-A or B-A-B type triblock copolymer, of which each block has different solubility to dispersion, coagulation energy to medium, and stability of distributed particles. Examples of the amphiphilic block copolymer may be polyoxyethylene-polyoxypropylene-polyoxyethylene, polyoxyethylene-polyoxypropylene, polyoxypropylene-polyoxyethylene-polyoxypropylene, polystyrene-polyoxyethylene, polystyrene-poly-2-vinylpyridine, polystyrene-poly-4-vinylpyridine, polyethylene-polyoxyethylene, polyethylenepropylene-polyoxyethylene, polymethylmethacrylate-polyoxyethylene, polystyrene-polymethylmethacrylate, polystyrene-polybutadiene, polystyrene-polybutadiene-polystyrene, polystyrene-polyisoprene, polystyrene-polyisoprene-polystyrene, polyN-vinylpyrrolidone-polystyrene, poly(dimethylamino)ethylmethacrylate-methacrylate, poly(2-dimethylamino)ethylmethacrylate-polybutylmethacrylate, polystyrene-poly-2-hydroxyethylmethacrylate, polyisobutyrene-polymethylvinylether, polystyrene-polyhydroxyethylvinylether, polystyrene-polyionicacetylene, polymethyl-(methyleneglycol)vinylether-polyisobutylvinylether, poly(2-(1-pyrrolidonyl)ethylvinylether-polyisobutylvinylether, or polylauryllactam-polytetrahydrofuran. More preferred are polyoxyethylene-polyoxypropylene-polyoxyethylene, polyoxyethylene-polyoxypropylene, polyoxypropylene-polyoxyethylene-polyoxypropylene polystyrene-polyoxyethylene, polystyrene-poly-2-vinylpyridine, polystyrene-poly-4-vinylpyridine, polyethylene-polyoxyethylene, polyethylenepropylene-polyoxyethylene, polymethylmethacrylate-polyoxyethylene, polystyrene-polymethylmethacrylate, polystyrene-polybutadiene, polystyrene-polybutadiene-polystyrene, polystyrene-polyisoprene, or polystyrene-polyisoprene-polystyrene.

Useful solvents may be methanol, ethanol, propanol, isopropanol, butanol, isobutanol, ethylacetate, butylacetate, acetonitrile, dimethylformaldehyde, dimethylsulfoxide, acetone, methylethylketone, methylisobutylketone, dimethylether, diethyleneglycol, diethylether, ethyleneglycol, dioxane, tetrahydrofuran, benzene, toluene, xylene, or water. More preferred are methanol, ethanol, propanol, acetone, ethylacetate, or water.

A zinc precursor of 0.01 to 99 parts by weight, and preferably 1 to 20 parts by weight based on 100 parts by weight of the solvent is admixed to the mixture to dissolve the zinc precursor. Dicarboxylic acid in the form of solid or liquid of 0.01 to 99 parts by weight, and preferably 1 to 10 parts by weight based on 100 parts by weight of the solvent, is added to the resulting solution.

The zinc precursor may be anhydrous zinc acetate, zinc hydroxide, zinc chloride, zinc nitrite, zinc perchlorate hexahydrate, zinc oxide, zinc sulfate, zinc acetatedihydrate, or zinc nitrate hexahydrate.

The dicarboxylic acid may be aliphatic dicarboxylic acids or aromatic dicarboxylic acids. Examples of aliphatic dicarboxylic acids are oxalic acid, malonic acid, succinic acid, glutaric acid, adipic acid, 1,5-pentane dicarboxylic acid, 1,6-hexane dicarboxylic acid, 1,8-octane dicarboxylic acid, and 1,10-decane dicarboxylic acid; and examples of the aromatic dicarboxylic acids are phthalic acid, isophthalic acid, terephthalic acid, 1,2-naphthalene dicarboxylic acid, 1,3-naphthalene dicarboxylic acid, 1,4-naphthalene dicarboxylic acid, 1,5-naphthalene dicarboxylic acid, 1,7-naphthalene dicarboxylic acid, 1,8-naphthalene dicarboxylic acid, 2,3-naphthalene dicarboxylic acid, 2,5-naphthalene dicarboxylic acid, 2,6-naphthalene dicarboxylic acid, or 2,7-naphthalene dicarboxylic acid. More preferred are glutaric acid or adipic acid. The dicarboxylic acid may be used solely or in combination thereof.

The solution is kept at a temperature between 30 and 80° C. for 1 to 24 hours, and preferably 5 to 10 hours while being violently shaken. The resulting dispersion is filtered while the temperature is maintained to prepare a catalyst for polymerization of aliphatic polycarbonates. The catalyst is then washed by the following procedures. The obtained precipitated material is diluted with the organic solvent and shaken for 1 to 24 hours to dissolve the amphiphilic copolymer, followed by filtering it to obtain filter cake and washing the filter cake with distilled water and acetone several times. The resulting material is dried in a vacuum drying oven at room temperature.

The catalyst of the present invention can prepare a polycarbonate polymer from carbon dioxide with a high yield such that the use of the catalyst allows an increase in the use of carbon dioxide, thereby effectively suppressing atmosphere pollution and climate change. In addition, the zinc dicarboxylic acid ester of the present invention can be prepared in the form of particles of various sizes and various types, e.g., nano particles, or film, and a polycarbonate polymer synthesized by zinc dicarboxylic acid ester has uses in many areas such as for ceramic binders, evaporative pattern casting, and adhesives.

In the application, a detailed description regarding the copolymerization of alkylene oxide and then carbon dioxide in the presence of the catalyst is not required in order to perform the present invention, because it is well known in the related arts, but one embodiment thereof will be briefly illustrated.

The catalyst is added to alkylene oxide and carbon dioxide is injected into the mixture at a predetermined pressure (e.g., 300 psi) followed by copolymerization. When the copolymerization is completed, an organic solvent such as methylene chloride is added to the resulting material and the obtained mixture is washed with diluted hydrochloric acid solution several times. The washed mixture is then washed with distilled water several times and precipitation is performed using methanol. The precipitated material is dried in a vacuum drying oven at room temperature.

The copolymerization is performed in the absence of organic solvents or in the presence of organic solvents such as 1,4-dioxane, toluene, benzene, methylene chloride, or cyclohexane. If the copolymerization is performed in the absence of organic solvents, the alkylene oxide or aliphatic cyclic ester which does not participate in the copolymerization but remain, acts as the solvent. When the copolymerization is completed, the remaining alkylene oxide and aliphatic cyclic ester is recovered and is reused.

The produced aliphatic polycarbonate preferably has a molecular weight of 500 to $5 \times 10^6$, which results in ready control of chemical or physical properties and forming properties.

The present invention is further explained in more detail with reference to the following examples, but the examples should not be construed as limiting the scope of the claimed invention.

EXAMPLE 1

(Preparation of Catalyst)

To a two-necked flask, 2.5 g of polyoxyethylene-polyoxypropylene copolymer (Trademark: Pluronic, PE6400; (ethyleneoxide: $EO)_{13}$(propyleneoxide: $PO)_{30}(EO)_{13}$, HLB(hydrophilic-lipophilic balance) 17, molecular weight: 2900)

and 2.5 g of zinc acetate dihydrate were added, and ethanol was added thereto to a total amount of 50 g followed by increasing the inner temperature to 60° C. and stirring with a magnetic bar. After the temperature increase, 1.5 g of glutaric acid was added to the resulting solution and reaction was carried out for 10 hours while violently shaking it. Thereafter, the stirring was stopped and it was filtered to obtain a precipitated material. The precipitated material was suspended with 100 ml of acetone and was allowed to stand in the beaker for 5 hours while being stirred followed by filtering and washing three times or more with distilled water and acetone. The residual solvent was removed from the resulting material under the condition of 50° C./5 mmHg and 2.2 g of a catalyst was obtained finally.

(Polymerization of Aliphatic Polycarbonate)

1 g of the catalyst was placed in an autoclave in a glove box under a nitrogen atmosphere, and 100 ml of propylene oxide was placed therewith. Thereafter, the reactor was pressurized to 300 psi with carbon dioxide. The polymerization was carried out for 40 hours while being kept at 60° C.

When the polymerization was completed, carbon dioxide was removed from the reactant and methylene chloride was added thereto. The resulting material was washed three times with diluted hydrochloric acid solution, and then with distilled water to remove catalyst from the resulting material. Then, the material was precipitated using methanol. The obtained precipitated material was filtered and dried to obtain 83 g of propylene carbonate polymer.

Analysis by infrared and nuclear magnetic resonance spectroscopy showed that the product was a copolymer of propylene oxide and carbon dioxide in a 1:1 mole ratio.

EXAMPLE 2

(Preparation of Catalyst)

1.9 g of a catalyst was prepared by the same procedure as in Example 1, except that 0.5 g of a copolymer of polyoxyethylene-polyoxypropylene was used.

(Polymerization of Aliphatic Polycarbonate)

57 g of a copolymer was prepared by the same procedure as in Example 1, except that the catalyst of this example was used.

EXAMPLE 3

(Preparation of Catalyst)

2.1 g of a catalyst was prepared by the same procedure as in Example 1, except that 5 g of a copolymer of polyoxyethylene-polyoxypropylene was used.

(Polymerization of Aliphatic Polycarbonate)

53 g of a copolymer was prepared by the same procedure as in Example 1, except that the catalyst of this example was used.

EXAMPLES 4~11

A catalyst was prepared by the same procedure as in Example 1, except that the copolymer was used as shown in Table 1 and polymerization was carried out by the same procedure as in Example 1, except the catalyst of these examples were used. The yield and the polymerization results are presented in Table 1.

EXAMPLE 12

2.2 g of a zinc adipic acid ester catalyst was prepared by the same procedure as in Example 1, except that 1.66 g of adipic acid was used.

(Polymerization of Propylene Carbonate)

29 g of a copolymer was prepared by the same procedure as in Example 1, except that the catalyst of the example was used.

EXAMPLE 13

2.2 g of a catalyst was prepared by the same procedure as in Example 1, except that 1.66 g of zinc nitrite was used.

(Polymerization of Propylene Carbonate)

65 g of a copolymer was prepared by the same procedure as in Example 1, except that the catalyst of this example was used.

COMPARATIVE EXAMPLE 1

2.1 g of a catalyst was prepared by the same procedure as in Example 1, except that a copolymer was not used, and 34 g of a copolymer was prepared by the same procedure as in Example 1, except that the catalyst of this example was used.

COMPARATIVE EXAMPLE 2

To a 250 ml two-neck flask, 8.1 g of zinc oxide and 13 g of glutaric acid were added, and the mixture was violently shaken in 150 ml of toluene solvent at 55° C. for 2 hours and was brought to reflux for 4 hours. The solid product was washed with acetone. The obtained zinc glutaric acid ester was set to a condition of 50° C./5 mmHg to remove the residual solvent, thereby obtaining 19 g of catalyst.

Using the catalyst, polymerization of propylene carbonate was undertaken by the same procedure as in Example 1 to prepare 53 g of polymer.

TABLE 1

| | Block copolymer | Yield (g) | Activity of catalyst (g of polymer/g of catalyst) |
|---|---|---|---|
| Example 1 | Pluronic PE6400 | 2.2 | 38 |
| Example 2 | Pluronic PE6400 | 1.9 | 30 |
| Example 3 | Pluronic PE6400 | 2.1 | 25 |
| Example 4 | Pluronic P123 | 2.01 | 75 |
| Example 5 | Pluronic F68 | 1.90 | 66 |
| Example 6 | Pluronic F108 | 1.85 | 70 |
| Example 7 | Pluronic F127 | 1.95 | 55 |
| Example 8 | Pluronic L10 | 2.05 | 62 |
| Example 9 | Pluronic L61 | 1.96 | 59 |
| Example 10 | Pluronic L81 | 2.10 | 50 |
| Example 11 | Pluronic L121 | 2.00 | 77 |
| Comparative Example 1 | No use | 2.1 | 16 |
| Comparative Example 2 | No use | 19 | 2.7 |

In Table 1, P123 is a copolymer of $(EO)_{20}(PO)_{70}(EO)_{20}$, with a molecular weight of 5820;

F68 is a copolymer of $(EO)_{80}:(PO)_{70}(EO)_{80}$, with an HLB of 29 and a molecular weight of 8780;

F108 is a copolymer with HLB of 27 and molecular weight of 14600;

F127 is a copolymer of $(EO)_{106}(PO)_{70}(EO)_{106}$, with HLB of 22 and molecular weight of 13388;

L10 is a copolymer with an HLB of 14 and a molecular weight of 3200;

L61 is a copolymer with an HLB of 3 and a molecular weight of 2000;

L81 is a copolymer with an HLB of 2 and a molecular weight of 2750; and

L121 is a copolymer of $(EO)_5(PO)_{70}(EO)_5$, with a molecular weight of 4500.

It is evident from Table 1 that the catalyst activity according to Examples 1 to 11 exhibits better than that according to Comparative Examples 1 and 2. Such high activity is believed to be because of a different and new surface structure by use of the amphiphilic block copolymer.

As described above, the present invention prepares a zinc dicarboxylic acid ester catalyst with a modified surface structure using an amphiphilic block copolymer. Such modification of surface structure renders a higher activity than that of the conventional catalyst, and the method is environmentally friendly without the use of organic solvent. The polycarbonate can be formed as a film or particle, and it has uses in many areas such as for ceramic binders, evaporative pattern casting, and adhesives. In addition, the method uses carbon dioxide as a monomer so that atmospheric pollution and climate change due to carbon dioxide can be controlled.

What is claimed is:

1. A method of preparing a zinc containing catalyst for polymerization of aliphatic polycarbonates, said method comprising:
   (i) mixing 1 to 20 parts by weight of a templating agent with 100 parts by weight of a solvent to form a solution;
   (ii) mixing 1 to 20 parts by weight of a zinc precursor with the solution;
   (iii) precipitating material comprising a zinc containing, dicarboxylic acid ester catalyst after mixing 1 to 10 parts by weight of an organic dicarboxylic acid with the solution and;
   (iv) separating the catalyst from the templating agent in the precipitated material.

2. The method of claim 1, wherein the templating agent is a non-ionic surfactant.

3. The method of claim 1, wherein the templating agent is an amphiphilic block copolymer.

4. The method of claim 3, wherein the amphiphilic block copolymer is a diblock copolymer, in which a block in the diblock is different from each other.

5. The method of claim 3, wherein the amphiphilic block copolymer is an A-B-A type triblock copolymer or a B-A-B type triblock copolymer.

6. The method of claim 1, wherein the templating agent is selected from the group consisting of polyoxyethylene-polyoxypropylene-polyoxyethylene, polyoxyethylene-polyoxypropylene, polyoxypropylene-polyoxyethylene-polyoxypropylene, polystyrene-polyoxyethylene, polystyrene-poly-2-vinylpyridine, polystyrene-poly-4-vinylpyridine, polyethylene-polyoxyethylene, polyethylenepropylene-polyoxyethylene, polymethylmethacrylate-polyoxyethylene, polystyrene-polymethylmethacrylate, polystyrene-polybutadiene, polystyrene-polybutadiene-polystyrene, polystyrene-polyisoprene, polystyrene-polyisoprene-polystyrene, polyN-vinylpyrrolidone-polystyrene, poly(dimethylamino)ethylmethacrylate-methacrylate, poly(2-dimethylamino)ethylmethacrylate-polybutylmethacrylate, polystyrene-poly-2-hyroxyethylmethacrylate, polyisobutyrene-polymethylvinylether, polystyrene-polyhydroxyethylvinylether, polystyrene-polyionicacetylene, polymethyl-3-(methyleneglycol)vinylether-polyisobutylvinylether, poly(2-(1-pyrrolidonyl)ethylvinylether-polyisobutylvinylether, and polylauryllactam-polytetrahydrofuran.

7. The method of claim 6, wherein the templating agent is selected from the group consisting of polyoxyethylene-polyoxypropylene-polyoxyethylene, polyoxyethylene-polyoxypropylene, polyoxypropylene-polyoxyethylene-polyoxypropylene, polystyrene-polyoxyethylene, polystyrene-poly-2-vinylpyridine, polystyrene-poly-4-vinylpyridine, polyethylene-polyoxyethylene, polyethylenepropylene-polyoxyethylene, polymethylmethacrylate-polyoxyethylene, polystyrene-polymethylmethacrylate, polystyrene-polybutadiene, polystyrene-polybutadiene-polystyrene, polystyrene-polyisoprene, and polystyrene-polyisoprene-polystyrene.

8. The method of claim 1, wherein the zinc precursor is selected from the group consisting of anhydrous zinc acetate, zinc hydroxide, zinc chloride, zinc nitrite, zinc perchlorate hexahydrate, zinc oxide, zinc sulfate, zinc acetate dihydrate, and zinc nitrate hexahydrate.

9. The method of claim 1, wherein the organic dicarboxylic acid is aliphatic dicarboxylic acid or aromatic dicarboxylic acid.

10. A method of polymerizing an aliphatic polycarbonate, said method comprising:
   (i) mixing 1 to 20 parts by weight of a templating agent with 100 parts by weight of a solvent to form a solution;
   (ii) mixing 1 to 20 parts by weight of a zinc precursor with the solution;
   (iii) precipitating material comprising a zinc containing, dicarboxylic acid ester catalyst after mixing 1 to 10 parts by weight of an organic dicarboxylic acid with the solution;
   (iv) separating the catalyst from the templating agent in the precipitated material; and
   (v) combining said catalyst with an alkylene oxide and carbon dioxide under copolymerization conditions to produce an aliphatic polycarbonate.

* * * * *